United States Patent
Miyamoto et al.

(10) Patent No.: US 9,798,080 B2
(45) Date of Patent: Oct. 24, 2017

(54) METHOD AND APPARATUS FOR FABRICATION OF METAL-COATED OPTICAL FIBER, AND THE RESULTING OPTICAL FIBER

(71) Applicants: AFL Telecommunications LLC, Duncan, SC (US); Fujikura Ltd., Tokyo (JP)

(72) Inventors: Matsuhiro Miyamoto, Greenville, SC (US); Masami Miyachi, Chiba (JP)

(73) Assignee: AFL Telecommunications LLC, Duncan, SC (US)

( * ) Notice: Subject to any disclaimer, the term of this patent is extended or adjusted under 35 U.S.C. 154(b) by 5 days.

(21) Appl. No.: 14/775,361

(22) PCT Filed: Mar. 14, 2014

(86) PCT No.: PCT/US2014/028151
§ 371 (c)(1),
(2) Date: Sep. 11, 2015

(87) PCT Pub. No.: WO2014/152896
PCT Pub. Date: Sep. 25, 2014

(65) Prior Publication Data
US 2016/0025925 A1    Jan. 28, 2016

Related U.S. Application Data

(60) Provisional application No. 61/783,027, filed on Mar. 14, 2013, provisional application No. 61/918,476, filed on Dec. 19, 2013.

(51) Int. Cl.
G02B 6/036    (2006.01)
C23C 18/16    (2006.01)
(Continued)

(52) U.S. Cl.
CPC .......... *G02B 6/03694* (2013.01); *B05D 1/18* (2013.01); *C03C 25/108* (2013.01); *C03C 25/16* (2013.01);
(Continued)

(58) Field of Classification Search
CPC .. G02B 6/02; G02B 6/02395; G02B 6/03622; G02B 6/4497; G02B 6/036;
(Continued)

(56) References Cited

U.S. PATENT DOCUMENTS 3,994,786 A    11/1976    Marks et al.
4,409,263 A    10/1983    Aloisio et al.
(Continued)

FOREIGN PATENT DOCUMENTS

| CN | 1469938 A | 1/2004 |
| DE | 2647108 A1 | 4/1978 |
| EP | 0419882 A1 | 4/1991 |

OTHER PUBLICATIONS

AFL Telecommunications LLC; European Supplementary Search Report for European Patent Application No. 1476823; dated Nov. 8, 2016; (2 pages).
(Continued)

*Primary Examiner* — Akm Enayet Ullah
*Assistant Examiner* — Michael Mooney
(74) *Attorney, Agent, or Firm* — Dority & Manning, P.A.

(57) ABSTRACT

Method and apparatus for producing metal-coated optical fiber involves providing a length of optical fiber having a glass fiber with or without a carbon layer surrounded by a liquid-soluble polymeric coating. The optical fiber is passed through a series of solution baths such that the fiber will contact the solution in each bath for a predetermined dwell time, the series of solution baths effecting removal of the polymer coating and subsequent electroless plating of metal
(Continued)

on the glass fiber. The optical fiber is collected after metal plating so that a selected quantity of the metal-coated optical fiber is gathered, Preferably, the glass fiber passes through the series of solution baths without contacting anything except for the respective solution in each.

24 Claims, 6 Drawing Sheets

(51) Int. Cl.
| | |
|---|---|
| C03C 25/46 | (2006.01) |
| C23C 18/18 | (2006.01) |
| B05D 1/18 | (2006.01) |
| C23C 18/32 | (2006.01) |
| G02B 1/10 | (2015.01) |
| G02B 6/02 | (2006.01) |
| G02B 6/44 | (2006.01) |
| C03C 25/10 | (2006.01) |
| C03C 25/16 | (2006.01) |
| C03C 25/52 | (2006.01) |
| C03C 25/54 | (2006.01) |
| C03C 25/70 | (2006.01) |

(52) U.S. Cl.
CPC .............. *C03C 25/52* (2013.01); *C03C 25/54* (2013.01); *C03C 25/70* (2013.01); *C23C 18/1619* (2013.01); *C23C 18/1628* (2013.01); *C23C 18/1632* (2013.01); *C23C 18/1664* (2013.01); *C23C 18/1893* (2013.01); *C23C 18/32* (2013.01); *G02B 1/10* (2013.01); *G02B 6/02395* (2013.01); *G02B 6/036* (2013.01); *G02B 6/03622* (2013.01); *G02B 6/4497* (2013.01)

(58) Field of Classification Search
CPC ..... G02B 6/03694; C03C 25/12; C03C 25/16; C03C 25/18; C03C 25/52; C03C 25/54; C03C 25/70; C03C 25/106; B05D 1/00; B05D 1/18

USPC .............. 385/123–128; 427/163.2, 264, 271; 65/431

See application file for complete search history.

(56) References Cited

U.S. PATENT DOCUMENTS

| | | | |
|---|---|---|---|
| 4,418,984 A | 12/1983 | Wysocki et al. | |
| 4,461,540 A | 7/1984 | Franken | |
| 4,485,122 A | 11/1984 | Williams et al. | |
| 4,592,932 A * | 6/1986 | Biswas | C03C 25/104 205/138 |
| 4,964,694 A | 10/1990 | Oohashi et al. | |
| 5,296,011 A * | 3/1994 | Aikawa | C03C 25/1075 118/50.1 |
| 5,333,227 A | 7/1994 | Ishiharada et al. | |
| 5,342,503 A | 8/1994 | Byler et al. | |
| 5,343,822 A | 9/1994 | Husain | |
| 5,380,559 A | 1/1995 | Filas et al. | |
| 5,767,970 A | 6/1998 | Cordova | |
| 6,040,357 A | 3/2000 | Murphy et al. | |
| 6,355,301 B1 * | 3/2002 | Miller | C03C 17/10 427/163.2 |
| 6,733,824 B1 * | 5/2004 | Bookbinder | B82Y 30/00 427/154 |
| 3,213,756 A1 | 7/2012 | Herbst | |
| 2003/0012491 A1 | 1/2003 | Shaw et al. | |
| 2005/0141830 A1 | 6/2005 | Peret | |
| 2010/0306888 A1 | 12/2010 | Tischler et al. | |
| 2010/0310219 A1 | 12/2010 | Bookbinder et al. | |

OTHER PUBLICATIONS

International Search Report and Written Opinion dated Sep. 10, 2014 in corresponding international application No. PCT/US20141028151, all enclosed pages cited.

AFL Telecommunication LLC; Office Action for Chinese Patent Application No. 2014800283808 dated Jan. 12, 2017; (2 pages).

* cited by examiner

METHOD AND APPARATUS FOR FABRICATION OF METAL-COATED OPTICAL FIBER, AND THE RESULTING OPTICAL FIBER

BACKGROUND OF THE INVENTION

The present invention relates to optical fiber. More particularly, the present invention relates to metal-coated optical fiber, and techniques for manufacturing same.

Optical fiber is typically constructed having a polymer coating, but some applications necessitate the use of metal-coated optical fiber. One problem with metal-coated optical fiber is that it is not commercially available in long lengths.

Current metal-coated optical fibers are typically manufactured by a liquid freezing method or a metal plating method. The liquid freezing method is described in detail in A. Mendez & T. F. Morse, Specialty Optical Fibers Handbook, Academic Press (2007), at pages 491-510 ("Metal-Coated Fibers"), which is incorporated herein by reference in its entirety for all purposes. As a brief description of the liquid freezing method, optical fiber is coated with metal by the fiber passing though a die filled with liquid metal or molten metal in line with a fiber drawing process.

Particularly when the thickness of metal coating is decreased less than ten micron, this freezing process has the possibility of mechanical contact of optical fiber with the coating die due to small fluctuation of the drawing tower or environmental conditions (such as temperature change, wind, vibration, etc.). A bare fiber without a thick polymer coating is fragile against handling or mechanical contact with any hard material. (A thin carbon layer is sometimes coated in line with drawing as a hermetic barrier. It will be appreciated that an optical fiber with a carbon layer less than one micron without any additional coating is still fragile against normal handling) So any mechanical contact with hard material can cause mechanical damage on the optical fiber surface and can degrade long term mechanical reliability.

In order to avoid mechanical contact of fiber with the coating die, the typical coating thickness of metal-coated fiber made by a liquid freezing method is larger than ten micron to obtain enough mechanical strength. However, the transmission loss of fiber with a thicker metal coating is larger due to thick metal thermal contraction. In particular, the contraction of the metal layer causes microbending loss when metal shrinks from liquid phase to solid phase due to the thermal expansion coefficient.

For metal-coated fiber exhibiting lower losses, thicker glass diameter needs to be selected (e.g., more than about 200 micron) to resist microbending due to metal contraction. But thick diameter of 200 micron or greater limits bending radius due to larger bending strain.

Difficulties in manufacturing metal plated optical fiber are due, in part, to incompatibility between the fiber drawing and polymer coating process and the metal plating process. In particular, such processes involve different process speeds and different line travel directions. Drawing, for example, is a vertical process and its line speed is typically more than 10 meter/min. On the other hand, a continuous plating process would be a horizontal process with a typical line speed of less than several meter/min.

So, in the production of metal-coated optical fiber, the optical fiber needs to be temporarily coated during the drawing process and taken into reel. The protective coating is applied because it is difficult to wind a drawn bare fiber into a reel as it is. As one skilled in the art will appreciate, bare fiber without a protective coating is fragile and can easily be broken by touching any hard material. After being reeled in this way, the optical fiber can be paid off from the reel for plating.

Referring now to FIG. 1, a typical plating process of the prior art is illustrated. As will be appreciated, electroplating or electroless plating is a wet process which means the fiber is immersed in liquid solution baths. (The jagged lines in each bath vessel represent the liquid surface.) The metal is coated on the glass fiber as a result of chemical reaction in a liquid. Typically, optical fiber is dipped in several baths in series for cleaning, sensitizing, activation and plating. Each wet process takes one to several minutes to occur in each of the baths. (The process time depends on coating thickness and temperature.) As illustrated by the downward arrows in FIG. 1, short fibers or fiber ends are dipped in a bath. (See, for example, U.S. Pat. No. 5,380,559, incorporated herein by reference in its entirety for all purposes.) Each target fiber moves vertically and is immersed in a bath. After sufficient time, it is retracted from the bath and moved horizontally to the top of the next bath. The plating will be done by soaking in a series of such baths.

Referring now to FIG. 2, conventional metal wire can be coated in a continuous process. As shown, the wire contacts one or more cathode rolls as it proceeds through the process. Additional pulleys may also be provided along the process direction to facilitate movement of the wire. One skilled in the art will appreciate that conventional wire (unlike optical fiber) is robust for handling or bending with tension because it is made of metal rather than glass. (See U.S. Pat. Nos. 5,342,503 and 3,994,786, each of which is incorporated by reference in its entirety for all purposes.)

Optical fiber cannot be coated using the same coating process that would be used with metal wire. If the bare fiber is prepared and enters into wet baths by contacting with pulleys, the pulleys can damage the fiber. In particular, such pulleys are typically made of plastic or metal on the surface, which is hard and can damage the fibers through contact. Even if the pulleys are made of soft material, small dust of hard particles such as silica or metal or any solids may cause damage to the optical fiber's surface due to fiber tension when some such particles exist between fiber and pulley. The bare fiber travels along path line in contact with some pulleys and therefore mechanical damage is caused at some points along the fiber length statistically. So bare fiber is not applicable to metallic continuous plating process to achieve long metal-coated optical fiber. As a result, most application of metal plating to optical fiber is metallization of short ends of optical fiber.

The present invention recognizes the foregoing considerations, and others, of the prior art.

SUMMARY OF THE INVENTION

In accordance with one aspect, the present invention provides a method for producing metal-coated optical fiber. One step of the method involves providing a length of optical fiber having a glass fiber surrounded by a liquid soluble polymeric coating. The optical fiber is passed through a series of solution baths such that the glass fiber will contact the solution in each bath for a predetermined dwell time, the series of solution baths effecting removal of the polymer coating and subsequent plating of metal on the glass fiber. The optical fiber is collected after metal plating so that a selected quantity of the metal-coated optical fiber is gathered.

Another aspect of the present invention involves a method for producing metal-coated optical fiber. One step of the method involves providing a length of optical fiber having a glass fiber surrounded by a water soluble polymeric coating. The optical fiber is passed through a water bath to remove the polymeric coating. After removal of the polymeric coating, the optical fiber is passed through at least one solution bath such that the glass fiber will contact solution therein for a predetermined dwell time in order to achieve electroless plating of metal on the glass fiber. The optical fiber is collected after metal plating so that a selected quantity of the metal-coated optical fiber is gathered.

According to another aspect of the present invention, an apparatus is provided for containing a liquid through which glass fiber passes on a continuous basis during an optical fiber manufacturing process. The apparatus comprises a first vessel containing a quantity of the liquid, the first vessel defining an inlet hole and an outlet hole for allowing moving passage of the glass fiber through the first vessel. A reservoir containing reserve liquid is also provided. The apparatus further comprises a pump for drawing the reserve liquid from the reservoir to replace liquid spilled from the vessel.

A still further aspect of the present invention provides an apparatus for containing a liquid through which glass fiber passes on a continuous basis during an optical fiber manufacturing process. The apparatus comprises a vessel defining an inlet hole and an outlet hole for allowing moving passage of the glass fiber through the vessel. The vessel is configured to contain a quantity of the liquid and to define an ullage above the quantity of the liquid. A vacuum source is in fluid communication with the ullage to create a negative pressure therein, thus inhibiting spillage of the liquid from the inlet and outlet holes.

Another aspect of the present invention provides an optical fiber comprising a glass fiber including a core and a cladding with or without a carbon layer. The optical fiber further includes a water soluble polymeric coating.

An additional aspect of the present invention provides a metal-coated optical fiber comprising a glass fiber having a length greater than one meter, the glass fiber including a core and a cladding (with or without a carbon layer). A metal coating, which surrounds and contains the cladding, extends along substantially the entire axial length of the glass fiber. The glass fiber preferably has a diameter no greater than about 200 microns and the metal coating preferably has a thickness of no greater than about 10 microns.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
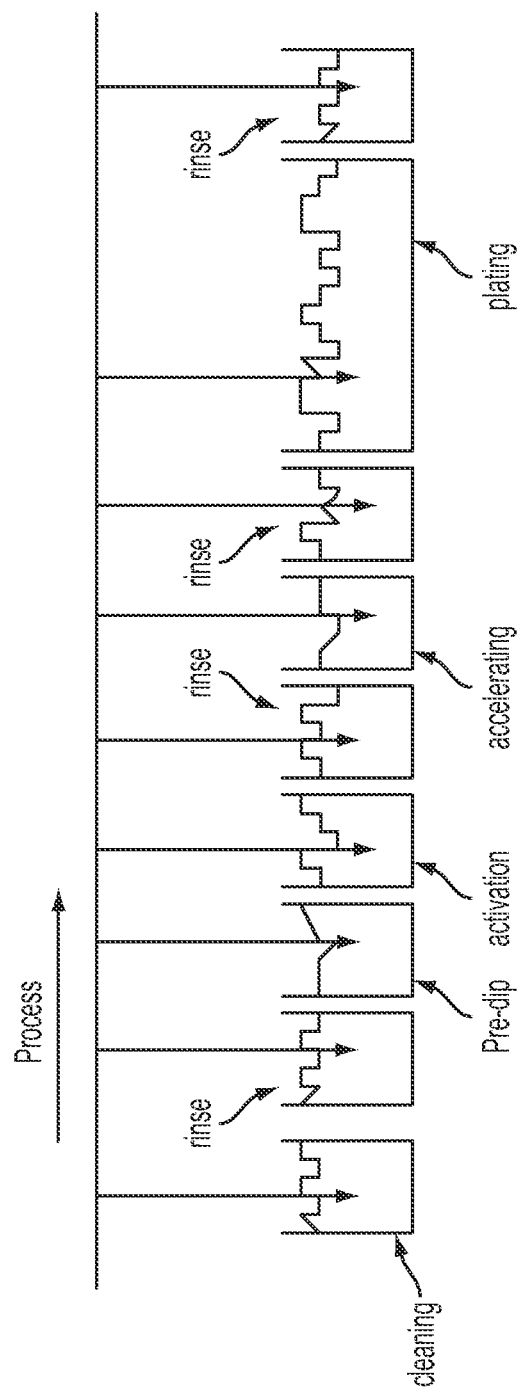
FIG. 1 is a diagrammatic representation showing a batch plating process of the prior art used to create short lengths of metal-coated optical fiber.
Figure 2:
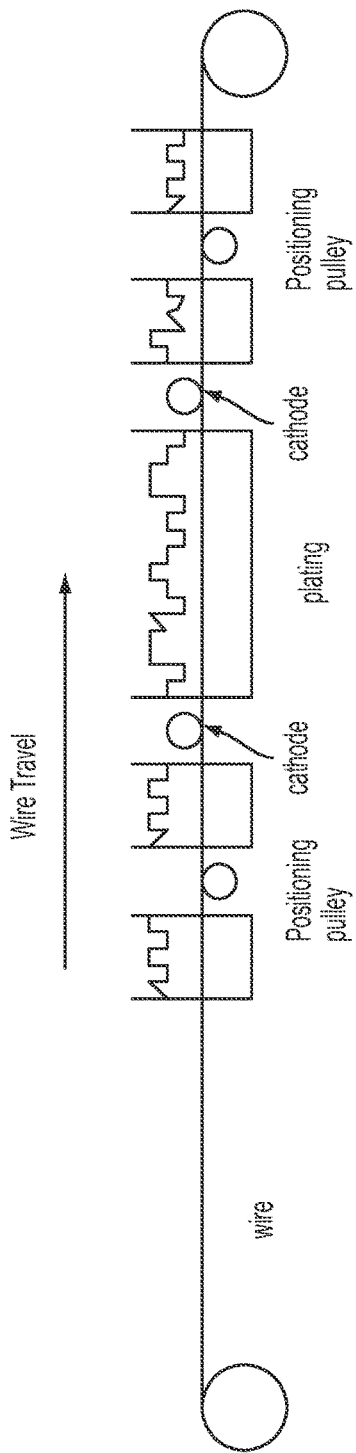
FIG. 2 is a diagrammatic representation showing a continuous coating process of the prior art to coat conventional metal wire.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

The present invention provides various improvements in metal-coated optical fiber and methods of making the same. In particular, metal plating may be applied along continuous lengths of optical fiber (such as lengths up to ten kilometers) with sufficient mechanical strength along the whole length. According to an important aspect of the present invention, metal-coated optical fibers may be coated by a continuous plating process in which a bare fiber enters into several liquid baths without physical contact with any solid materials.

Figure 3:
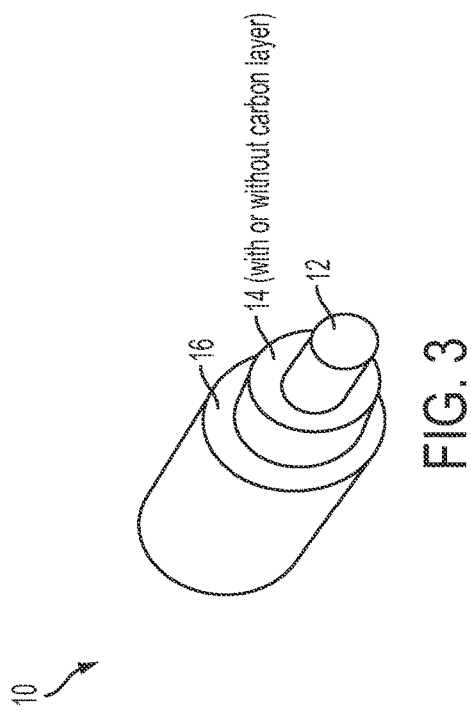
FIG. 3 is a perspective diagrammatic view of a metal-coated optical fiber with layers cut away.

Referring now to FIG. 3, an exemplary metal-coated fiber 10 is illustrated. Fiber 10 includes a glass fiber having a core 12 and a cladding 14. A metal coating 16 surrounds and contains the cladding/core combination. Metal coating 16 may be formed of any suitable metal which may be applied by electroless plating, such as nickel, copper, gold, silver, or suitable alloys. In accordance with a preferred embodiment, the diameter of the cladding/core combination may often be less than about 200 micron with the metal coating 16 often having a diameter less than about ten micron.

Figure 4:
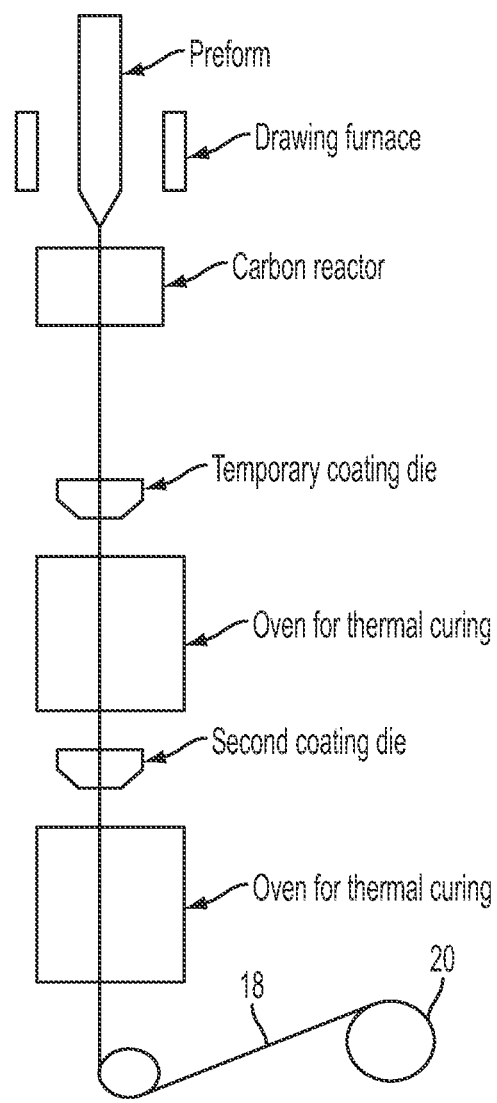
FIG. 4 illustrates an exemplary process for drawing optical fiber and applying a temporary coating thereto.

Certain aspects of the present invention involve novel methodology and materials for the temporary protective coating applied during the drawing process. In this regard, FIG. 4 illustrates an exemplary fiber drawing process during which a temporary protective coating is applied. Toward this end, various types of possible temporary coatings are contemplated. One skilled in the art will appreciate that the temporary coating should provide enough protection against handling while being easily removable. Normal accrylate coating may be removed by solvent such as dichlormethane, MEK and acetone. While dichloromethane is good for removing acclylate coating, its use presents certain concerns. MEK and acetone are generally effective but each takes long time to remove coating by dissolving and it is also difficult to remove the coating with only MEK or acetone without mechanical touch. Moreover, MEK and acetone are flammable which also presents concerns.

Another candidate for the temporary coating material is wax. For example, wax having a melting temperature of less than 100 deg. C. might be used because it can be removed with hot water. However, the resulting fiber, even after most of the wax is removed, may not have enough elasticity for handling.

To eliminate these issues, some preferred embodiments of the present invention utilize a water soluble polymer for the temporary coating. The water soluble polymer used for the temporary coating has enough elasticity and gives enough protective coating for handling and mechanical strength. In accordance with exemplary methodology, optical fiber coated with water soluble polymer is paid off and enters into a removing bath. Bare fiber without any polymer thus comes out just before proceeding to the plating baths. The resulting bare fiber preferably goes through several liquid baths without physical contact with any solid materials (only liquid) and its fiber surface is processed in liquids such as cleaning, rinsing, dry, sinsetizing and plating. In particular, the fiber preferably travels through the bath solutions without any physical contact with any hard material until the fiber becomes enough robust with metalic deposition growth.

Water soluble polymer becomes solid when it is dried and it becomes liquid when immersed in water. As for water soluble polymer, sodium polyacrylater, plyacrylamide, polyvinyl alcohol, polyethyleneimine, polyethylene glycol, polyvinylpyrrolidone etc. are applicable. Viscosity of the water solution is preferably controlled to be 1-5000 mPa-s is good for application of fiber coating.

One example of a water soluble polymer believed to be suitable for this purpose is vinyl alcohol copolymer (product name nichigo G-polymer OKS-8049, sold by nippon gohsei). In this regard, FIG. 4 illustrates a vertical fiber drawing process where the fiber 18 is continuously coated with water soluble polymer as a temporary protective coating. First, a water soluble polymer solution is prepared with appropriate viscosity by mixing water with G-polymer. Then, water soluble polymer is applied to normal drawing process (as shown in FIG. 4). In one case, for example, optical fiber glass diameter is 125 micron, drawing speed is around 25 m/min, oven temperature is 200 deg. C. The water soluble polymer may be applied in a double layer coating as shown, yielding a coating thickness of about 9 micron. (The optical fiber may or may not have a carbon layer.) Cured fiber is them taken up into reel 20 in desired lengths of several kilometers or more. Typically, there will be no mechanical damage will occur to the fiber during drawing.

Figure 5:
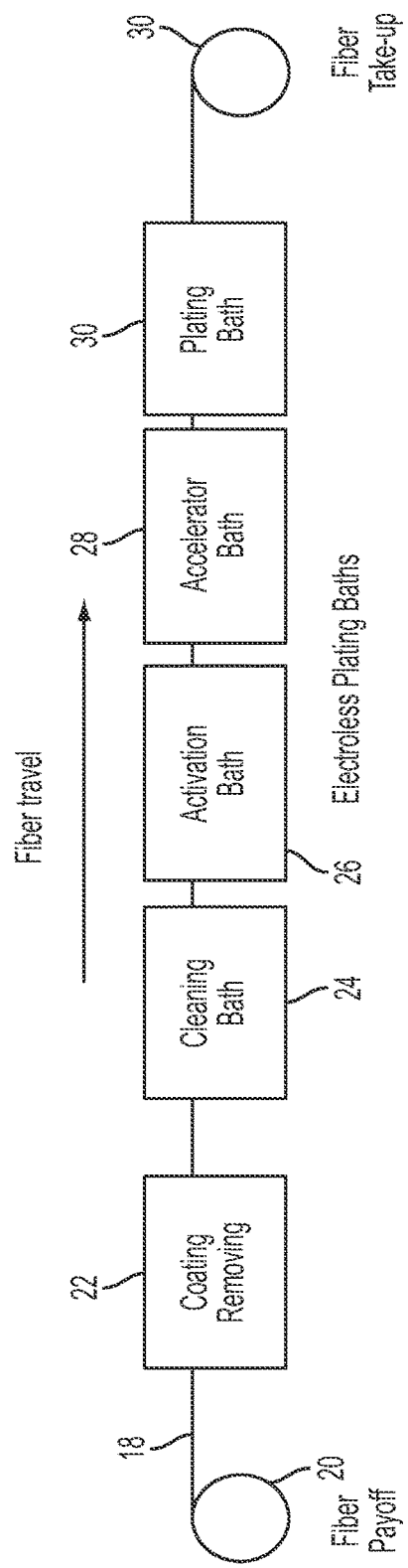
FIG. 5 illustrates an exemplary process for coating optical fiber with metal in accordance with an embodiment of the present invention.

FIG. 5 is a diagrammatic representation of an exemplary process in accordance with the present invention for producing metal-coated optical fiber on a continuous basis. According to this embodiment, the fiber 18 is paid off of reel 20 and first passed through a coating removing bath 22 in a manner that does not contact any hard materials. The coating bath contains a suitable liquid to remove the polymer. For example, if the polymer requires removal by chemical solvent (e.g., accrylate removal by MEK or acetone), bath 22 will contain the appropriate solvent. In the case of water soluble polymer coating, bath 22 contains water to remove the polymer. Fiber 18 remains in contact with the removal liquid for a sufficient dwell time for the particular temperature. For example, with the exemplary water soluble polymer referenced above, the water may be at room temperature (i.e., unheated) with a dwell time of no more than about one minute in order to completely remove the polymer. In the case of chemical solvents for removal of other temporary polymer coatings, the process time for removing may be up to approximately 5 min.

After the temporary protective coating is removed, the fiber passes through a series of baths to achieve electroless metal plating. In this example, the successive baths are cleaning bath 24, activator bath 26, accelerator bath 28, and plating bath 30. As will be explained below, each bath preferably has a configuration similar to the coating removing bath which prevents contact of bare fiber with any hard materials. The solution of each bath depends on metal and plating objectives. According to one example, nickel may be plated as thick as 3 micron using nickel phosphorus solution. One skilled in the art will appreciate that the fiber's duration of transit through the process is set so that the fiber will have sufficient dwell time in each bath. Of course, the geometry of the respective baths also contributes to the dwell time in each. In one example, the following parameters may be used: line speed of 0.1 m/min, cleaning 5 min, activator time of 4 min, accelerator 3 min, and plating time of 13 min at 80 deg. C. After plating in bath 30, the continuous process ends at take-up reel (pulley) 32.

As noted, the fiber 18 passes through each of the baths 22, 24, 26, 28, and 30 without contacting anything other than water or the process liquid. At feed reel (pulley) 20, the fiber will have the temporary polymer coating which prevents contact between the optical fiber glass and the pulley. At take-up pulley 32, the fiber has been sufficiently strengthened by the metal coating in order to contacted again.

Figure 6:
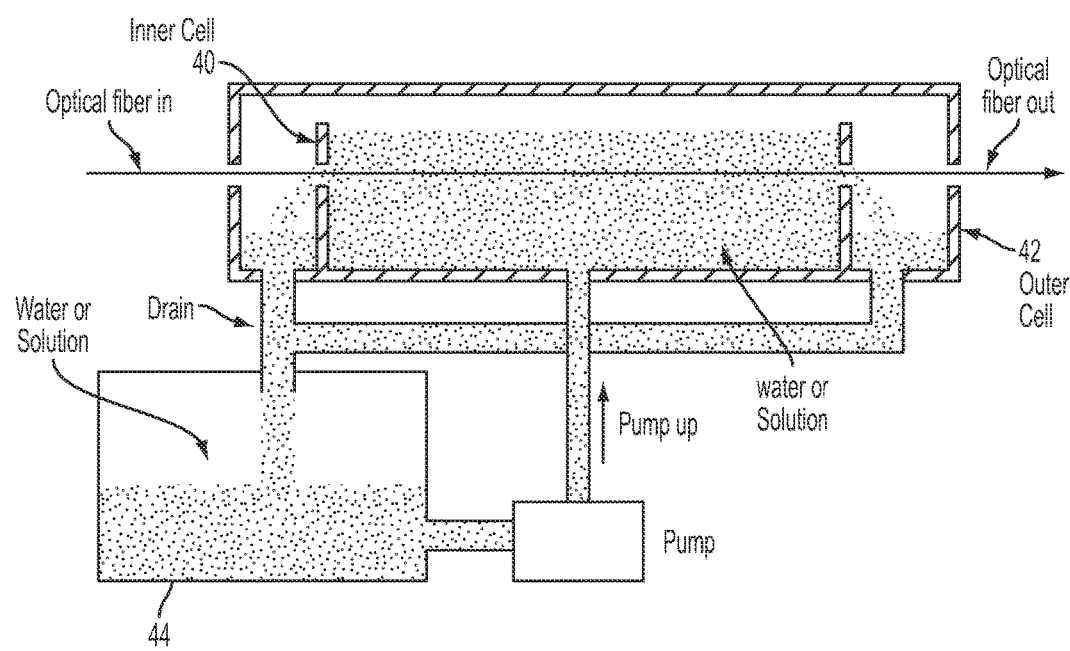
FIG. 6 is a diagrammatic representation of a bath arrangement that may be used in the process of FIG. 5 in accordance with an embodiment of the present invention.

FIG. 6 illustrates one configuration of an arrangement that can be used in the process of FIG. 5 to ensure that the optical fiber does not contact anything except the water or process solution (depending on which bath). In this case, fiber 18 passes through exits (i.e., fiber inlet and outlet) of a bath where liquid flows out and below the level of liquid. The bath arrangement includes dual cells, an inner cell (vessel) 40 and an outer cell (vessel) 42. Inner cell 40 contains sufficient liquid such that it flows over from exits at each end (as shown). Outer cell 42 receives the liquid which flows out from inner cell 40 for recirculation. The liquid received by outer cell 42 flows to solution reservoir 44. A slight pulling tension applying to fiber will give straight passing through holes or slits of walls without touching.

As shown, solution in reservoir 44 is pumped up into inner cell 40 to keep the fiber immersed in a liquid of the cell. It will be appreciated that the fiber will have a tendency to sag between pulleys 20 and 32 due to gravity. Because the inlet into inner cell 40 from the pump is located at bottom of the cell, this tends to push the fiber up by the flow of the liquid. The upward force counteracts the sagging due to gravity and prevents the fiber from contacting hard components, such as the bottom or walls of inner cell 40. The fiber's vertical position will preferably be controlled to keep constant against sag by monitoring position and adjusting the flow rate of the incoming solution, if necessary.

Figure 7:
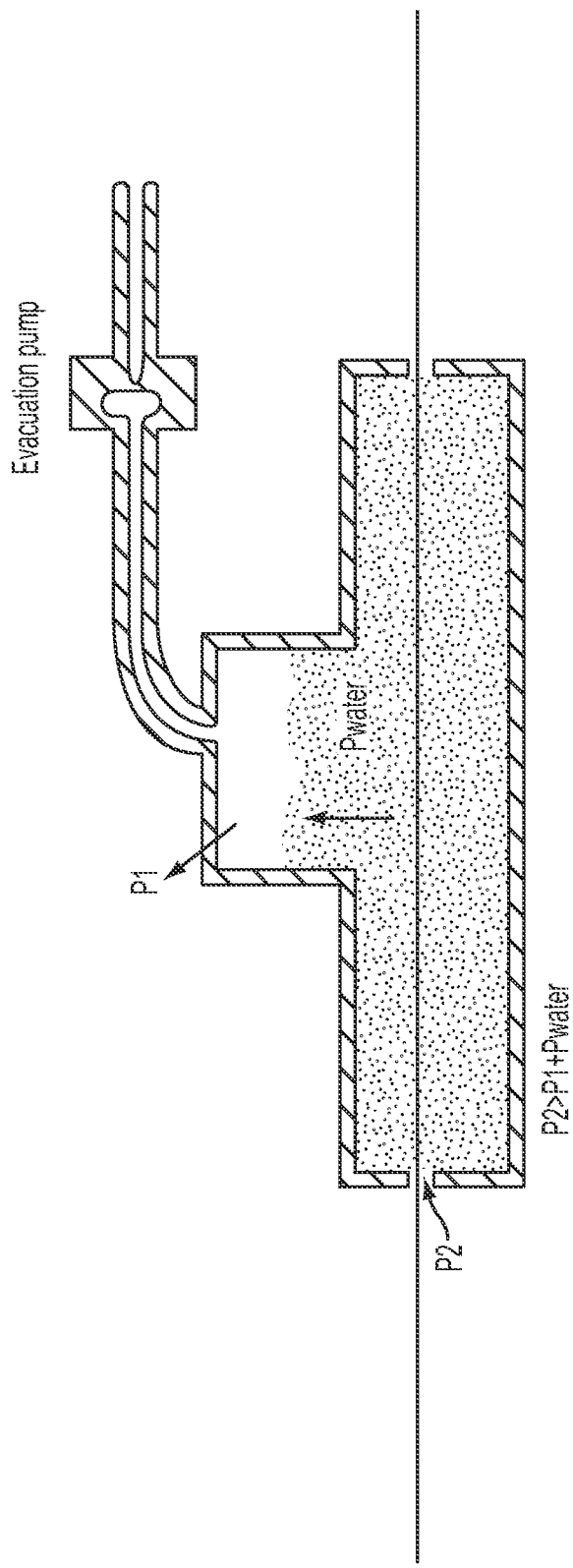
FIG. 7 is a diagrammatic representation of a bath arrangement that may be used in the process of FIG. 5 in accordance with another embodiment of the present invention.

In an alternative embodiment, fibers may be passed through wet baths without mechanical contact utilizing pressure difference. For example, the inner cell may be enclosed and the ullage space in the cell evacuated. In such an arrangement, a pressure difference is caused between ambient pressure of the outer cell and the ullage space of the inner cell. As a result, the liquid does not flow out from the exit or inlet holes which are located under the level of liquid. A configuration of this concept is shown in FIG. 7.

One skilled in the art will appreciate that various advantages are achieved by a system configured in accordance with the present invention. Notably:

(1) Bare fiber is coated with metal without any mechanical contact with hard materials such as die or pulleys. The mechanical reliability of produced fiber is not consequently degraded. A long fiber without mechanical defects can thus be produced.

(2) The inlet or outlet size of the bath vessels is large enough for a fiber to pass through compared with the size of a die. The coating thickness is not determined by the size of the hole and is instead determined by the process time. Therefore, a thin metal coating can be achieved without mechanical damage.

(3) A thin metal coating achievable according to the process described herein will not cause significant fiber shrinkage due to thermal contraction because of thin layer and low thermal gap. (Because the process temperature is less than 100 deg. C. in preferred embodiments, low loss fiber is achieved.)

Additional advantages are realized by the use of a water soluble polymer for the temporary coating:

(1) Water soluble polymer is coated well in drawing process as well as thermal cure polymer because liquid polymer becomes solid by drying. Good compatibility with conventional thermal cure polymer coating.

(2) The removing solution is just water. It is safe and easy handling.

(3) Dissolution speed is very high. Typical dissolution speed of 10 micron polymer is within 1 min in room temperature water. Hotter water may be used to achieve faster dissolution times.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A method for producing metal-coated optical fiber, said method comprising:
   (a) providing a length of optical fiber having a glass fiber surrounded by a liquid soluble polymeric coating;
   (b) passing said optical fiber through a series of solution baths such that the glass fiber will contact the solution in each bath for a predetermined dwell time, the series of solution baths effecting removal of said polymer coating and subsequent plating of metal on the glass fiber, wherein the glass fiber passes through the series of solution baths without contacting anything except for the respective solution in each of said solutions baths and wherein each of said solutions baths comprises a vessel having inlet and outlet holes through which said optical fiber passes horizontally without contacting said vessel; and
   (c) collecting the optical fiber after metal plating so that a selected quantity of said metal-coated optical fiber is gathered.

2. A method as set forth in claim 1, wherein said glass fiber has a carbon layer.

3. A method as set forth in claim 1, wherein said liquid soluble polymeric coating comprises a polymeric material that is removed by a chemical solvent.

4. A method as set forth in claim 3, wherein said polymeric material that is removed by a chemical solvent comprises acrylate.

5. A method as set forth in claim 1, wherein said liquid soluble polymeric coating, comprises a water soluble polymer.

6. A method as set forth in claim 5, wherein said water soluble polymer is selected from the group consisting of sodium polyacrylater, plyacrylamide, polyvinyl alcohol, polyethyleneimine, polyethylene glycol, and polyvinylpyrolidone.

7. A method as set forth in claim 5, wherein said water soluble polymer of said polymeric coating is removed by water at substantially room temperature.

8. A method as set forth in claim 7, wherein said water soluble polymer of said polymeric coating is removed by said water in no more than approximately one minute dwell time.

9. A method as set forth in claim 1, wherein liquid in said vessel flows out of said inlet and outlet holes for recirculation.

10. A method as set forth in claim 1, wherein liquid is inhibited from flowing out of said inlet outlet holes due to ambient pressure.

11. A method as set forth in claim 1, wherein said liquid soluble polymeric coating is applied to said glass fiber by passing said glass fiber through at least one die containing a polymer solution.

12. A method as set forth in claim 11, wherein said glass fiber is passed vertically through said at least one die.

13. A method as set forth in claim 11, wherein said polymer has a viscosity of 1-5000 mPa-s.

14. A method as set forth in claim 1, wherein the metal is plated on said glass fiber via an electroless plating process.

15. A method as set forth in claim 14, wherein the metal is selected from a group consisting of nickel, copper, gold, silver, and suitable alloys.

16. A method as set forth in claim 1, wherein said length of optical fiber is between one and ten kilometers in length.

17. A method for producing metal-coated optical fiber, said method comprising:
   (a) providing a length of optical fiber having a glass fiber surrounded by a water soluble polymeric coating;
   (b) passing said optical fiber through a water bath to remove said polymeric coating;
   (c) passing said glass fiber through at least one solution bath after removal of said polymeric coating such that the glass fiber will contact solution therein for a predetermined dwell time in order to achieve electroless plating of metal on the glass fiber, wherein the glass fiber passes through the at least one solution bath without contacting anything except for the in the at least one solution bath and wherein the at least one solution bath comprises a vessel having inlet and outlet holes through which said optical fiber passes horizontally without contacting said vessel; and
   (d) collecting the optical fiber after metal plating so that a selected quantity of said metal-coated optical fiber is gathered.

18. A method as set forth in claim 17, wherein said glass fiber has a carbon layer.

19. A. method as set forth in claim 17, wherein said water soluble polymer is selected from the group consisting of sodium polyacrylater, plyacrylamide, polyvinyl alcohol, polyethyleneimine, polyethylene glycol, and polyvinylpyrolidone.

20. A method as set forth in claim 17, wherein said water soluble polymer of said polymeric coating is removed by water at substantially room temperature.

21. A method as set forth in claim 20, wherein said water soluble polymer of said polymeric coating is removed by said water in no more than approximately one minute dwell time.

22. A method as set forth in claim 17, wherein said water soluble polymeric coating is applied to said glass fiber by passing said glass fiber through at least one die containing a polymer solution.

23. A method as set forth in claim 22, wherein said polymer has a viscosity of 1-5000 mPa-s.

24. A method as set forth in claim 17, wherein the metal is selected from a group consisting of nickel, copper, gold, silver, and suitable alloys.

\* \* \* \* \*